INVENTOR
JEAN-CLAUDE SCHNEIDER
By Raymond W Cotton
ATTORNEY

United States Patent Office 3,306,027
Patented Feb. 28, 1967

3,306,027
SHOCK-ABSORBING BEARING FOR TIMEPIECE
Jean-Claude Schneider, La Chaux-de-Fonds, Switzerland, assignor to Fabrique d'horlogerie Chs. Tissot et fils S.A., Neuchatel, Switzerland, a Swiss company
Filed Nov. 1, 1965, Ser. No. 505,865
Claims priority, application Switzerland, Nov. 5, 1964, 14,334/64
8 Claims. (Cl. 58—140)

The present invention relates to a shock-absorbing bearing for a timepiece. In such bearings a movable element including a bearing member is disposed in a bearing casing and normally maintained in position by a resilient member braced between the bearing casing and the movable element.

In the majority of known shock-absorbing bearings of this type, the resilient member acts only in a lateral direction. The movable element shifts on a plane surface of the bearing casing, which is formed with a central aperture, and the bearing member is returned into a position coaxial with the said aperture under the action of the resilient member, by sliding on the said plane surface. The disadvantage of these known devices is that the resilient member, which is a part of very small dimensions, and is delicate to manipulate, may undergo slight deformations in the course of its manufacture and fitting, and that in this case the movable element of the bearing is not normally maintained in an exactly centered position.

Bearings are also known which comprise a movable element, for example a footstep bearing member which is urged axially by a resilient member and which bears against a frusto-conical surface of the bearing casing. In order that the movable element may be automatically recentered after a lateral shock, it is necessary for the resilient member to develop a fairly considerable axial force, so that devices of this type are not very suitable for timepiece bearings, and particularly for bearings intended to be fitted in watches of small dimensions.

The object of the present invention is to obviate the disadvantages of the known bearings.

According to the invention we provide a shock-absorbing bearing for a timepiece, comprising a movable element including a bearing member disposed in a bearing casing and normally maintained in position by a resilient member braced between the bearing casing and the movable element, the resilient member being formed with lateral arms extending between the bearing casing and the movable element and capable of flexing laterally and axially, the bearing casing having a frusto-conical guide surface for guiding the movable element, to bring the latter into its normal position under the action of the resilient member after a shock.

The accompanying drawing illustrates, by way of example, two embodiments of a bearing according to the invention. In the drawings.

Figure 1:
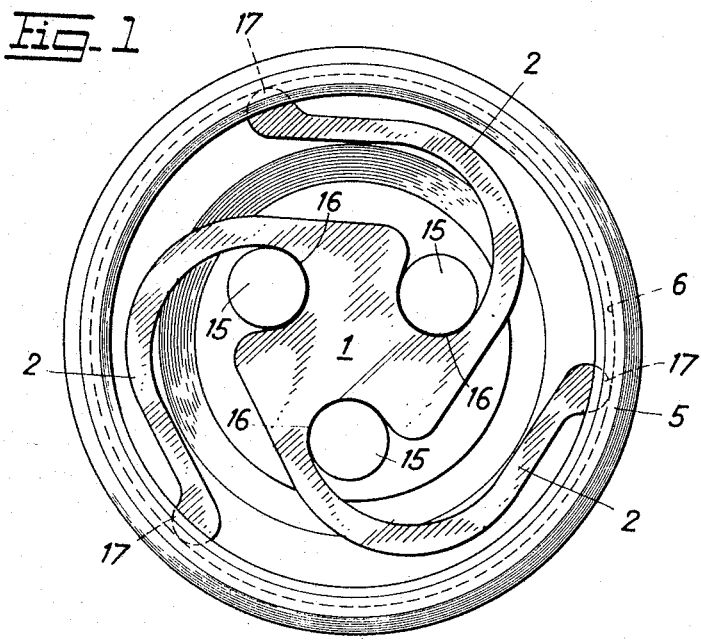
FIG. 1 is a top plan view of each of the two embodiments.

The bearings illustrated in the drawing both comprise a resilient member 1 having three lateral arms 2 capable of flexing laterally and axially, whereby they ensure the resilience of the bearing in three dimensions and its approximate recentering after a lateral shock. The exact centering is effected in each case by a frusto-conical surface 3 provided within a bearing casing 4. The latter comprises a cylindrical lateral wall 5, the inside face of which is formed with a circular annular groove 6 of rectangular profile. Its base includes a planar bottom portion 7 which surrounds an aperture 8 for the passage of the arbor of a movable member supported by the described bearing. The aperture 8 in the bearing casing is founded at the bottom by a shoulder 12 of annular shape, which constitutes an axial abutment. The arbor of the movable member pivoted in the described bearing, which in turn includes a shoulder whose external diameter is greater than that of the aperture 8, is thus retained by the shoulder 12 in the event of an axial shock. Likewise, the wall of the aperture 8 constitutes an abutment which limits the radial displacement of the arbor.

Figure 2:
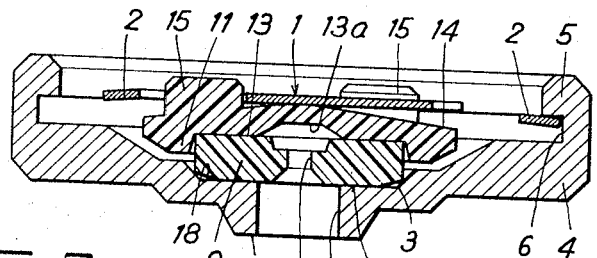
FIG. 2 is a side elevation in section of the first embodiment.

The movable element of the bearing of FIG. 2 comprises a bearing member 9 formed with a profiled aperture 10, and an endpiece 11, these two members being formed from a plastics material.

The endpiece 11 has in its inside face a recess 13, of which the flank is slightly flared downwards, and in which the bearing member 9 is engaged. Its upper face 14 is convex, and three circular pillars 15 disposed at the corners of a triangle project therefrom, these pillars engaging with the resilient member 1. For this purpose, the resilient member, which consists of a thin stamped plate, is formed with three recesses 16, each of which is situated at the root of one of the arms 2. Each of the said recesses is engaged around one of the pillars 15. The three arms of the member 1 are spaced apart by 120° and are each of a generally spiral form. At its end, each arm 2 has a rounded edge 17 which is engaged in the groove 6 and which bears against the lateral flank of the said groove. Thus, when the movable element 9, 11 is laterally shifted, the ends of the arms 2 can be deflected and thus slide against the flank of the groove 6 before returning the movable element into its centered position.

The bearing member 9 of FIG. 2 has within its outer lower edge a bevel 18, of which the angle in relation to the axis of the bearing is greater than that of the surface 3, so that this edge is in contact with the frusto-conical surface 3 along a circular line extending midway of the height of this surface. The movable element and the bearing casing are thus prevented from coming into contact along parallel surfaces, which might cause jamming. After a lateral displacement due to a shock, the movable element readily returns to its normal position under the action of the resilient member 1 due to the sliding of its lower outer edge along the surface 3.

In the event of an axial shock, the end of the pivot of the arbor abuts the base of a cut-away portion 13a at the centre of the recess 13. The force of the shock is also damped due to the simultaneous deflection of the arms 2 of the resilient plate 1. The depth of the cut-away portion 13a is such that there remains at the centre of the endpiece 11 only a thin web of plastics, against the upper side of which the central portion of the resilient member 1 bears. The rigidity of this metallic portion prevents the web from deforming under the effect of shocks and thus obviates the danger of deterioration of the surface forming the base of the said cut-away portion.

The movable elements 9, 11 are so fitted that in the normal position illustrated in the drawings, the lower face of the bearing member 9 is in contact with the surface 7 of the bearing casing.

Figure 3:
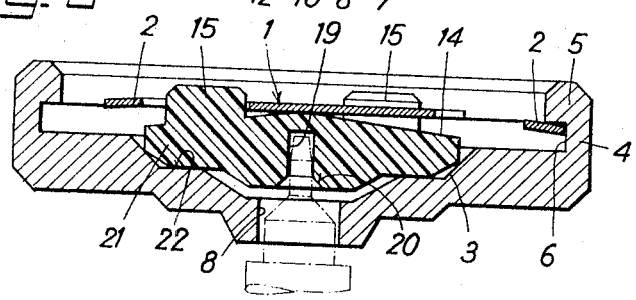
FIG. 3 is a side elevation in section of the second embodiment.

The constructional from illustrated in FIG. 3 differs from that of FIG. 2 essentially in that the movable element 21 is here integrally formed. The frusto-conical surface 3 of the bearing casing extends around a plane annular surface 22 which stabilises the element 1 in the event of radial shocks and the circular edge by which the movable element 21 is normally in contact with the surface 3 corresponds to the maximum diameter of the movable element. The latter has in its lower face a cylindrical recess 19 formed with a frusto-conical countersunk portion 20. The base of this recess is situated at a very short distance from the upper face 14, so that there remains between the recess and the central portion of the resilient plate 1 only a thin web of plastics. When an axial shock occurs, the end of the pivot of the arbor supported by the bearing can abut the base of the recess 19. Owing to the small thickness of plastics material extending between the pivot and the plate 1, the latter performs a supporting function and prevents excessive forces from being exerted on the web. Thus, the axial abutment element has sufficient rigidity, while the self-lubricating properties of the plastics material are fully utilised.

In the case of the bearing of FIG. 3, the pivot of the arbor engaged in the recess 19 has a cylindrical bearing surface adapted to the diameter of the recess 19 and a frusto-conical portion terminated by a plane surface which bears against the base of the recess. This arrangement makes it possible to reduce the length of fit of the bearing surface of the pivot.

Finally, in the two described embodiments, the recesses 16 may be adjusted to the dimensions of the pillars 15 so that they engage between these pillars with some gripping action. The resilient member 1 is thus secured to the movable element, whereby the mounting and demounting of the bearing are facilitated.

In the manufacture of the described bearings, the movable element may be made of a self-lubricating sintered metallic material, for example, instead of a plastics material.

I claim:

1. A shock absorbing bearing for a timepiece comprising a bearing body containing a cavity, movable pivot supporting means received in said cavity, and a resilient member resiliently holding said means in said cavity, said movable means having a rear surface and containing a recess extending close to said rear surface leaving a thin wall portion between said rear surface and the bottom of said recess, said resilient member comprising a relatively rigid central portion abutting said rear surface at said thin wall portion and a plurality of resilient arms extending from said central portion having end portions connected to said bearing body.

2. A shock absorbing bearing according to claim 1 wherein said movable means is a unitary plastic body having a front surface penetrated by said recess, and said resilient arms are arcuate and diverge from said central portion.

3. A shock absorbing bearing according to claim 1 wherein said movable means includes a plastic bearing member and a separate plastic end piece, said end piece providing said thin wall portion.

4. A shock absorbing bearing according to claim 1 wherein said resilient arms are arcuate and diverge from said central portion.

5. A shock absorbing bearing according to claim 1 wherein said movable means provides a plurality of pillars projecting from said rear surface in spaced relationship to said thin wall portion, and said resilient member provides recesses between said arms receiving said pillars.

6. A shock absorbing bearing according to claim 1 wherein said bearing body provides an annular shoulder within said cavity and a frusto-conical guiding surface surrounding said shoulder, and said movable means provides a peripheral circular edge engaging said guiding surface to centralize said movable means under the influence of said resilient member, following a shock.

7. A shock absorbing bearing according to claim 1 wherein said bearing body has an annular plane shoulder surface, and a frusto-conical guiding surface surrounding said shoulder surface and coaxial therewith, said movable means being of plastic material and having a peripheral circular edge engaging said guiding surface under the action of said resilient member to restore said movable means to a normal position following displacement thereof by shock.

8. A shock absorbing bearing according to claim 7 wherein said bearing body has an inner periphery containing an annular groove having a plane annular wall coaxial with said shoulder surface, and said arms have rounded end portions received in said groove and engaging said annular wall for sliding movement when said movable means is shifted laterally.

References Cited by the Examiner

FOREIGN PATENTS

| | | |
|---|---|---|
| 217,008 | 9/1941 | Switzerland. |
| 284,493 | 11/1952 | Switzerland. |
| 332,553 | 10/1958 | Switzerland. |
| 335,740 | 8/1961 | Switzerland. |

RICHARD B. WILKINSON, *Primary Examiner.*

GERALD F. BAKER, *Assistant Examiner.*